United States Patent Office 3,748,257
Patented July 24, 1973

3,748,257
HYDROCRACKING CATALYST AND PROCESS
Olaf A. Larson, O'Hara Township, Allegheny County, and Adam V. Vayda, Oakmont, Pa., assignors to Gulf Research & Development Company, Pittsburgh, Pa.
No Drawing. Continuation-in-part of abandoned application Ser. No. 818,111, Apr. 21, 1969. This application July 16, 1971, Ser. No. 163,427
Int. Cl. C10g 13/02, 23/02
U.S. Cl. 208—111                                                 4 Claims

ABSTRACT OF THE DISCLOSURE

A process for hydrocracking hydrocarbons carried out in the presence of a novel fluorine-promoted, tungsten sulfide hydrogenation catalyst prepared by impregnating a silica-alumina support with a water-soluble tungsten salt, calcining at 400° F. to 800° F. and then sulfiding with a gaseous sulfiding material.

---

This patent application is a continuation-in-part of our United States patent application Ser. No. 818,111, filed Apr. 21, 1969 now abandoned.

This invention relates to a novel method for hydrocracking hydrocarbon oils in the presence of an improved fluorine-promoted, tungsten sulfide catalyst on a silica-alumina support. The invention is directed more particularly to an improved method for hydrocracking hydrocarbon oils in which the hydrogenation catalyst is prepared by a critical procedure that will produce a catalyst of unusually high activity for hydrocracking. This procedure for preparing the catalyst includes a critical calcination temperature which is outside the temperature range normally utilized and results in a calcined product of greater surface area and sulfidability. The high hydrocracking activity accomplished by the use of this catalyst is complemented with increased catalyst life. Quite unexpectedly the optimum calcination temperature for this catalyst was found to be substantially below that temperature generally employed in the art. This invention was most surprising not only because the calcination temperature is significantly below the calcination range normally used, but also because calcination of the same catalyst at the normally used temperature produced a useable catalyst without there existing the slightest indication that a superior calcination temperature was possible.

Calcination temperatures generally used in the prior art range from about 900° to 1200° F. and most generally are about 1000° F. This seems to be true regardless of composition of the composite under consideration. Our invention is also surprising in view of the work done with a closely related hydrogenation catalyst composed of nickel, tungsten, and fluorine on a silica-alumina base material. The optimum calcination temperature for this composite as the result of a study over a wide range of temperatures has been determined to be about 900° F. showing a full consistency with the normally used range of calcination temperatures for catalysts in general. Moreover, it was found that as the calcining temperature was reduced in preparing this related nickel-tungsten catalyst below the 900° F. level, a significant loss of activity was noted. Therefore, it was surprising to discover that a silica-alumina support impregnated with tungsten and fluorine would exhibit superior hydrocracking activity when calcined at an unusually low temperature of about 400° to 800° F., and preferably about 500° to about 750° F., and then sulfided. The term catalyst precursor as used herein defines the composite composed of tungsten, fluorine and silica-alumina prior to its activation for use as a catalyst by calcination and sulfiding.

As a matter of comparison two identical fluorine-promoted, tungsten sulfide hydrocracking catalyst precursors were prepared. Prior to sulfiding one was calcined at a conventional 1000° F. and the other was calcined at about 625° F. After sulfiding, the precursor which was calcined at 1000° F. demonstrated an activity for converting pretreated FCC furnace oil to a gasoline type fraction boiling below 400° F. of 26 vol. percent while the precursor calcined at 625° F. produced 63 vol. percent of the same product under the same test conditions as the 1000° F. calcined material. Adjusting the calcination temperature resulted in an increase in catalytic activity of 142 percent indicating a chemical or physical difference in the two finished catalysts, identically prepared except for the calcination temperature.

Also, this catalyst prepared at a calcination temperature of between about 400° and about 800° F. possesses an increased surface area which enhances its activity and gives it longer catalyst life. For example, the catalyst prepared as described herein at a calcination temperature of 625° F. had a surface area of 234 square meters per gram (m.$^2$/g.) which is an increase of 26 percent over the surface area of 186 m.$^2$/g. for the otherwise identical catalyst calcined at 1000° F.

Still another benefit derived from the novel procedure employed herein is the increased sulfidability of the resulting catalyst. The sulfided form of the catalyst, calcined at 625° F., contained 5.0 wt. percent sulfur while the catalyst calcined at 1000° F. contained only 1.3 wt. percent sulfur, after comparison activity test runs. The weight percent sulfur indicates the degree to which the tungsten oxide is converted to the sulfided state. In this case it is evident that the catalyst calcined at 625° F. is approximately four times more susceptible to conversion to the sulfided state than the same material calcined at 1000° F. The product of a sulfiding treatment of a metal oxide can be a mixture of sulfides, oxides, oxysulfides, free metal and possible free sulfur. Since the activity of the catalyst is related at least in part to the form of the metal sulfide present, there is substantial opportunity available for variations and improvement in catalyst activity. We believe that the high activity of our catalyst is due in part to the form and amount of the metal sulfide present which is related to the specific calcination temperature used. It is preferred to sulfide the catalyst prior to its use in the hydrocracking process unless the feed stock contains sufficient available sulfur compounds to convert the catalyst to the sulfided state during hydrocracking.

The silica-alumina material employed as the support can be either synthetic or natural in origin. Any conventional silica-alumina is satisfactory. For example, it can be prepared by the coprecipitation or cogelation of silica and alumina from mixed solutions of such materials as sodium silicate and aluminum sulfate or by the formation of a silica hydrogel by reaction of, for example, sodium silicate with an acid followed by incorporation of alumina. The particular supports to which this invention relates contain between 50 and 95 percent silica with the balance being substantially alumina. Supports of between 60 and 90 percent silica are more desirable and supports of between 65 and 85 percent silica are preferred, the balance in each case comprising alumina. Although the supports contemplated are preferably made up of alumina and silica only, other materials can be present in small amounts which do not adversely affect its superior properties when prepared in accordance with the specific conditions of this invention. The support must contain silica and alumina as described. If either component is missing, the resulting catalyst will not be effective for our hydrocracking process, that is, neither an alumina-supported nor a silica-supported catalyst when prepared by the novel procedure described herein is an effective hydrocracking catalyst.

The tungsten and fluoride are preferably added to the support material by simultaneous impregnation from a two-component solution containing a compound of each of the two elements. Impregnation as used herein means the incorporation of the tungsten and the fluorine into the support in the manner described herein. Alternatively, they can be incorporated in sequence with or without intervening calcination. In any case the calcination temperature should not exceed the broad range of about 400° to about 800° F. and preferably not exceed the optimum range of about 500° to about 750° F. When sequential incorporation is employed and intermediate calcination is desired, the intermediate calcination temperature should not exceed the aforementioned ranges. The calcination step follows the impregnation of the support. It can be conducted in a standard muffle furnace and the atmosphere should be a relatively dry, non-reducing gas such as air, nitrogen, helium or carbon dioxide. The calcination is continued for a period of time sufficient to induce a substantial increase in activity as measured by the ability of the catalyst to convert hydrocarbon feed fractions to product fractions boiling below the initial boiling point of the feed. Generally a time of between 1 and 24 hours is sufficient and preferably a time of between 4 and 16 hours is employed for the calcination.

Tungsten is added to the support material in the form of any water soluble compound of tungsten, in which the tungsten is present in the anion. We prefer to employ ammonium salts of tungstic acid and particularly ammonium metatungstate, ammonium tungstate or ammonium silico-dodecatungstate. Ammonium paratungstate may be employed where only small amounts of tungstate are to be incorporated. This salt has a low solubility in water and therefore should not normally be used where it is desired to incorporate large amounts of tungsten. Ammonium thiotungstate can also be used as the tungsten compound with no special advantage. We have surprisingly found that thiotungstate sulfur is lost from the catalyst during calcination in a non-reducing atmosphere which must be replaced in a sulfiding step following the calcination. Moreover, we have found that a thiotungstate impregnated catalyst precursor which is directly heated at sulfiding temperature in hydrogen sulfide without calcination possesses hydrocracking activity that is so low as to render it unsuitable as a hydrocracking catalyst. The tungsten should be present in the finished catalyst in amounts between about 6 and about 35 percent by weight and preferably between about 10 and about 25 percent by weight.

Fluorine can be added to the support material, as outlined above, in any conventional manner. To add fluorine it is satisfactory to use any fluorine compound soluble in water or a preparative mixture such as HF, $NH_4F$, $NH_4F \cdot HF$, $H_2SiF_6$ or $HBF_4$. Gaseous HF is also satisfactory. Aqueous HF is a prefered fluorine compound and solutions containing from about 2 percent to 10 percent HF are employed. Ordinarily the fluorine promoted hydrogenation catalyst should contain between about 1 and 5 percent by weight of fluorine and preferably between about 1.5 and 4 percent. However, these limits can be varied. The fluorine treatment is normally carried out at room temperature, although lower or elevated temperatures may be utilized. A prefered treating procedure is to subject the support material to a vacuum and then introduce the HF solution into the evacuated vessel holding the support. The vacuum is released and the support is drained to remove excess liquid.

After the support material is impregnated and calcined, as described above, it is sulfided for use in the hydrocracking process. The catalyst can be treated with a gaseous or liquid sulfur containing substance, preferably in the presence of a reducing material such as hydrogen, by exposure to the sulfur containing material. Hydrogen sulfide is the prefered sulfiding material. Examples of other sulfur containing materials are methyl sulfide, propyl sulfide, ammonium sulfide, propyl mercaptan, carbon disulfide, thiophene, etc. The sulfiding operation should preferably employ a hydrogen-hydrogen sulfide mixture comprising 1 to 99 volume percent hydrogen sulfide (measured at 60° F. and atmospheric pressure) at a temperature of 500° to 850° F. for a duration of 2 to 20 hours. It is preferred that the sulfiding conditions should include a hydrogen-hydrogen sulfide containing mixture having a volumetric ratio of hydrogen to hydrogen sulfide of 2 to 12, a temperature of 600° to 800° F. and a sulfiding time duration of 4 to 12 hours.

Hydrocracking of the hydrocarbon oil using this novel catalyst can be carried out at conventional conditions for hydrocracking including a temperature of about 500° F. to about 800° F., a pressure from about 300 p.s.i. to about 3,500 p.s.i., a hydrogen gas to oil ratio of about 4,000 to about 20,000 cubic feet of hydrogen at standard conditions (s.c.f.) per barrel of oil, and a liquid hourly space velocity of about 0.5 to about 4.0 liquid volumes of oil per volume of catalyst. The hydrocarbon oil can be any distillate hydrocarbon including naphtha (B.P. 100–350° F.) and kerosene (B.P. 250–500° F.) but is particularly useful for cracking furnace oil and light and heavy gas oils (B.P. 500–1100° F.).

The following examples are set out to illustrate the novel process of the invention and to provide a better understanding of its details and advantages.

A commercial silica-alumina powder containing about 75 percent $SiO_2$ on a calcined basis, was used for the support material. The silica-alumina powder, a small amount of wax and polyvinylalcohol binder were mixed together. The mixture was then formed into pellets. These pellets were dried at 250° F. for 24 hours. The pellets were then crushed and sized to 10–20 mesh and calcined at 1000° F. for 10 hours in a muffle furnace.

The support material prepared in a manner described above was impregnated with an aqueous solution of ammonium metatungstate and an aqueous solution of ammonium fluoride, employing the incipient wetness technique. The impregnated material was then oven dried at 250° F. The impregnated and dried material contained about 19 weight percent tungsten and 2 weight percent fluorine.

The thus impregnated and dried material was divided into 6 portions which were respectively calcined for 10 hours at 500°, 625°, 750°, 825°, 900° and 1000° F. in a preheated electric muffle furnace in an air atmosphere. The surface area of each catalyst was determined by the standard B.E.T. method with nitrogen. After calcination, the catalysts were each sulfided with a mixture of 8 percent hydrogen sulfide and 92 percent hydrogen for 8 hours at 800° F. The sulfided catalysts contained about 1.3 to 5.6 percent sulfur.

An FCC furnace oil that had been pretreated by hydrogenation to decrease its nitrogen content to less than 1.0 p.p.m. nitrogen was separately hydrocracked using each of these six catalysts. The hydrocracking was carried out at 600° F., 1000 p.s.i.g. hydrogen partial pressure, at a liquid hourly space velocity of 2.0 liquid volumes of oil per volume of catalyst per hour, utilizing a hydrogen to oil ratio of 10,000 s.c.f. hydrogen per barrel. The FCC furnace oil feed stock had a boiling range of 400° F. to 620° F. and conversion was reported as the volume percent of the feed stock converted to products boiling below 400° F. as measured by an A.S.T.M. D86 distillation on the total liquid product. After each run which consisted of 24 hours, the aged catalysts were each tested for sulfur content.

The results of the foregoing examples are tabulated as follows:

TABLE I

| Run No. | 1 | 2 | 3 | 4 | 5 | 6 |
|---|---|---|---|---|---|---|
| Catalyst: | | | | | | |
| Calcined, °F | 500 | 625 | 750 | 825 | 900 | 1,000 |
| Surface area. M₂/g | 230 | 234 | 222 | 215 | 195 | 186 |
| To gasoline, vol. percent | 57 | 63 | 61 | 53 | 47 | 26 |
| Sulfur content of aged catalyst, wt. percent | 5.6 | 5.0 | 4.6 | 3.7 | 2.9 | 1.3 |

A hydrocracking catalyst possesses both cracking activity and hydrogenation activity. We have discovered that the novel catalyst described herein possesses a significantly increased cracking function with no indication of an increase in its hydrogenation activity. This feature is particularly advantageous when a gasoline product is desired since maximum cracking to gasoline is desired but only moderate hydrogenation activity is desired to reduce olefinic structures and coking on the catalyst without hydrogenating the highly desired non-condensed aromatic structures.

It is to be understood that the above disclosure is by way of specific example and that numerous modifications and variations are available to those of ordinary skill in the art without departing from the true spirit and scope of our invention.

We claim:

1. The method of hydrocracking hydrocarbon oil having an initial boiling point of at least about 400° F. which comprises passing a mixture of said oil and a hydrogen containing gas through a hydrocracking zone maintained at hydrocracking conditions of temperature, pressure and relative proportions of hydrogen and oil and contacting said oil and hydrogen while within the said zone with the catalyst prepared by calcining a silica-alumina support impregnated with a water-soluble tungsten salt and a fluorine compound at a temperature between about 400° F. and about 800° F. in a non-reducing atmosphere, said support comprising between about 50 and about 95 percent silica and between about 50 and about 5 percent alumina, and then contacting said calcined material with a gaseous sulfiding material at a temperature between about 500° F. and about 850° F., and recovering a substantial yield of a gasoline-type fraction having a boiling point below 400° F.

2. The method of hydrocracking hydrocarbon oil in accordance with the method of claim 1 in which the catalyst comprises about 60 to about 90 percent silica in the support, about 6 to about 35 percent tungsten, and about 1 to about 5 percent fluorine.

3. The method of hydrocracking hydrocarbon oil in accordance with the method of claim 1 in which the calcination temperature is between about 500° F. and about 750° F., the catalyst comprises about 65 and about 85 percent silica in the support, about 10 to about 25 percent tungsten, and about 1.5 and about 4 percent fluorine.

4. The method of hydrocracking hydrocarbon oil in accordance with the method of claim 1 in which the calcination temperature is between about 500° F. and about 750° F., the catalyst comprises about 65 and about 85 percent silica in the support, about 19 percent tungsten and about 2 percent fluorine.

References Cited

UNITED STATES PATENTS 2,310,278   2/1943   Connolly _____ 208—111
2,939,837   6/1960   Berger _____ 208—136

DELBERT E. GANTZ, Primary Examiner

G. E. SCHMITKONS, Assistant Examiner

U.S. Cl. X.R.

252—442